United States Patent
Zhu et al.

(10) Patent No.: US 11,657,545 B2
(45) Date of Patent: May 23, 2023

(54) DEVICE, METHOD, SMART GLASSES FOR COLOR VISION DEFICIENCY CORRECTION

(71) Applicant: YUTOU TECHNOLOGY (HANGZHOU) CO., LTD., Hangzhou (CN)

(72) Inventors: Haichao Zhu, Hangzhou (CN); Yiming Chen, Hangzhou (CN)

(73) Assignee: YUTOU TECHNOLOGY (HANGZHOU) CO., LTD., Hangzhou (CN)

(*) Notice: Subject to any disclaimer, the term of this patent is extended or adjusted under 35 U.S.C. 154(b) by 23 days.

(21) Appl. No.: 17/225,760

(22) Filed: Apr. 8, 2021

(65) Prior Publication Data

US 2021/0319597 A1   Oct. 14, 2021

(30) Foreign Application Priority Data

Apr. 13, 2020   (CN) ............ 202010286361.2

(51) Int. Cl.
G06T 11/00 (2006.01)
G06T 7/215 (2017.01)
H04N 23/88 (2023.01)

(52) U.S. Cl.
CPC ........ G06T 11/001 (2013.01); G06T 7/215 (2017.01); H04N 23/88 (2023.01); G06T 2207/10024 (2013.01); G06T 2207/20084 (2013.01)

(58) Field of Classification Search
CPC .............. G06T 11/001; G06T 2207/10024
See application file for complete search history.

(56) References Cited

U.S. PATENT DOCUMENTS

2016/0217723 A1   7/2016   Kim et al.
2016/0270656 A1*  9/2016   Samec ............ A61B 3/063
(Continued)

FOREIGN PATENT DOCUMENTS

CN   101788342 A   7/2010
CN   108676704 A   7/2010
(Continued)

OTHER PUBLICATIONS

Seo et al., Real-time Adaptable and Coherent Rendering for Outdoor Augmented Reality, Nov. 3, 2018, EURASIP Journal on Image and Video Processing 2018, Article No. 118, pp. 1-8 (Year: 2018).*
(Continued)

*Primary Examiner* — Matthew Salvucci
(74) *Attorney, Agent, or Firm* — Getech Law LLC; Jun Ye

(57) ABSTRACT

The present invention relates to a device, method, and smart glasses for color vision deficiency correction. The method includes: adjusting a color of an image according to an environmental color temperature to obtain an adjusted image, and then adjusting a pixel level of the adjusted image to a preset pixel level according to image content, to obtain a to-be-processed image; determining an adjustment matrix based on an RGB value of the to-be-processed image and a preset RGB target value; comparing a color displayed on a display with a color of a standard colorimetric card for correction, to determine an adjustment mapping table; and generating a target image based on the to-be-processed image, the adjustment matrix, and the adjustment mapping table. The present invention increases the degree of color recognition and improves imaging effects, and can implement good color vision deficiency correction.

13 Claims, 4 Drawing Sheets

(56) References Cited

U.S. PATENT DOCUMENTS

2019/0281325 A1\* 9/2019 Song ............... H04N 19/98
2019/0301941 A1\* 10/2019 Kawabata ............ G01J 3/52

FOREIGN PATENT DOCUMENTS

| CN | 101973664 A | 2/2011 |
| CN | 103310736 A | 9/2013 |
| CN | 103514828 A | 1/2014 |
| CN | 104306102 A | 1/2015 |
| CN | 204079633 U | 1/2015 |
| CN | 204411879 U | 6/2015 |
| CN | 105624024 A | 1/2016 |
| CN | 106249406 A | 12/2016 |
| CN | 106396267 A | 2/2017 |
| CN | 108712639 A | 10/2018 |

OTHER PUBLICATIONS

Office Action issued in Chinese Application No. 202010286361.2, dated Dec. 22, 2020, 10 pages in Chinese and 10 pages in English.
Search Report issued in Chinese Application No. 202010286361.2, dated Apr. 13, 2020, 2 pages.

\* cited by examiner

DEVICE, METHOD, SMART GLASSES FOR COLOR VISION DEFICIENCY CORRECTION

TECHNICAL FIELD

The present invention relates to the field of color vision deficiency correction technologies, and in particular, to a device, method, and smart glasses for color vision deficiency correction.

BACKGROUND

Color vision deficiency refers to obstacles in recognizing colors. For example, patients with red-green color blindness cannot distinguish between red and green. Color vision deficiency is very common and causes many difficulties in life for patients. Color vision deficiency is caused by problems occurring to the development cone cells, and the root cause is the deletion of genes on the chromosomes. It is a genetic disease which cannot be treated currently, and thus it is difficult to completely restore the level of a person with color vision deficiency to that of a normal person. In the prior art, color vision deficiency correction is implemented usually by helping patients to enhance their capability of color discrimination. There are roughly four methods. The first method is to wear sunglasses, such as yellow, red or green sunglasses. The second method is to change a color on a display. These methods can be used to dynamically adjust the color according to different display contents. The third method is to use a 3D display to enhance the degree of color recognition through 3D information when displaying. The fourth method is to use VR glasses or AR glasses to enhance the color degree.

The above technologies all have corresponding disadvantages, and in the first method, colors cannot be adjusted according to the content of the environment seen. In addition, because sunglasses often have only one color, some important information may be filtered out, and it is extremely uncomfortable to wear the sunglasses. The second method is to change the color of the content when the content is displayed on the display. This method can only be used for devices with a display function such as TVs, displays, or mobile phones, and is not helpful for viewing ordinary objects. The third method can only be used for devices with a display function such as TVs, displays, or mobile phones, and is not helpful for viewing ordinary objects. Compared with the first three methods, the fourth method can be used to dynamically adjust the color according to the environment and is not limited to one color. Such a method uses devices that can be worn and carried around. However, the fourth method does not provide a good estimate of environmental lighting and colors. Because the environment has a great influence on the camera's imaging, it leads to deviations in the color estimation. In addition, this method also needs to display an image on the glasses, so the deviation of the color caused by the display must also be considered. This method currently does not take this hazard into consideration. It is also a display imaging problem. This method does not take the characteristics of the human eye and object movement into consideration, resulting in poor imaging effects, and the applicable scenarios are very limited.

SUMMARY

Objects of the present invention are to provide a device, method and smart glasses for color vision deficiency correction, such that the degree of color recognition is increased, imaging effects are improved, and good color vision deficiency correction can be implemented.

According to Embodiment 1 of the present invention, a color vision deficiency correction method is provided, including:

adjusting a color of an image according to an environmental color temperature to obtain an adjusted image, and then adjusting a pixel level of the adjusted image to a preset pixel level according to image content, to obtain a to-be-processed image;

determining an adjustment matrix based on an RGB value of the to-be-processed image and a preset RGB target value;

comparing a color displayed on a display with a color of a standard colorimetric card for correction, to determine an adjustment mapping table; and generating a target image based on the to-be-processed image, the adjustment matrix, and the adjustment mapping table.

Further, the color of the image captured by a camera is adjusted according to the environmental color temperature, and the RGB value of the image captured by the camera is adjusted by using the following formula:

$$R = \begin{cases} 255, & T \leq 66 \\ 329.6987 * (T-60)^{-0.133}, & T > 66 \end{cases}$$

$$G = \begin{cases} 99.47 * \ln T - 161.1195, & T \leq 66 \\ 288.12 * (T-60)^{-0.0755}, & T > 66 \end{cases}$$

$$B = \begin{cases} 255, & T \geq 66 \\ 0, & T < 19 \\ 138.51 * \ln(T-10) - 305.044, & T \leq 66 \end{cases}$$

where T denotes environmental color temperature/100.

Further, the adjusting a pixel level of the adjusted image to a preset pixel level includes:

performing inverse tone mapping on a preset key frame of the adjusted image, and performing motion estimation on frames other than the preset key frame so as to adjust the pixel level of the adjusted image to the preset pixel level, where one frame is processed for every preset number of frames of the adjusted image, and the processed frame is the key frame.

Further, the method further includes: using a first neural network to perform inverse tone mapping on the preset key frame of the adjusted image, and using an optical flow method to perform motion estimation on frames other than the preset key frame, where the first neural network is a neural network with an encoder-decoder architecture.

Further, the method further includes: setting the RGB target value according to a type of color vision deficiency and a degree of color vision deficiency.

Further, the generating a target image based on the to-be-processed image, the adjustment matrix, and the adjustment mapping table includes:

restoring the pixel level of the to-be-processed image to an original pixel level to obtain a to-be-mapped image;

mapping the to-be-mapped image according to the adjustment mapping table and the adjustment matrix to obtain a to-be-displayed image; and if AR display is performed, mixing the to-be-displayed image with an illumination information image passing through a lens and then displaying the image; and if VR display is performed, displaying the to-be-displayed image.

Further, the restoring the pixel level of the to-be-processed image to an original pixel level to obtain a to-be-mapped image includes:

inputting the to-be-processed image into a second neural network for processing, where the second neural network is an inverted architecture of the first neural network; and estimating a motion trajectory of each pixel between the frames other than the preset key frame, and estimating a value displayed by pixels of the frames other than the preset key frame according to a value that needs to be displayed by a current pixel of a current frame and the motion trajectory of each pixel between the frames, so as to obtain the to-be-mapped image.

According to Embodiment 2 of the present invention, a color vision deficiency correction device is provided, including:

a module for acquiring a to-be-processed image, configured to adjust a color of an image according to an environmental color temperature to obtain an adjusted image, and then adjust a pixel level of the adjusted image to a preset pixel level according to image content, to obtain a to-be-processed image;

a module for determining an adjustment matrix, configured to determining an adjustment matrix based on an RGB value of the to-be-processed image and a preset RGB target value;

a module for determining an adjustment mapping table, configured to compare a color displayed on a display with a color of a standard colorimetric card for correction, to determine an adjustment mapping table; and a target image generation module, configured to generate a target image based on the to-be-processed image, the adjustment matrix, and the adjustment mapping table.

Further, the module for acquiring a to-be-processed image includes an image color adjustment unit configured to adjust the color of the image captured by a camera according to the environmental color temperature, and specifically adjust the RGB value of the image captured by the camera by using the following formula:

$$R = \begin{cases} 255, & T \leq 66 \\ 329.6987 * (T-60)^{-0.133}, & T > 66 \end{cases}$$

$$G = \begin{cases} 99.47 * \ln T - 161.1195, & T \leq 66 \\ 288.12 * (T-60)^{-0.0755}, & T > 66 \end{cases}$$

$$B = \begin{cases} 255, & T \geq 66 \\ 0, & T < 19 \\ 138.51 * \ln(T-10) - 305.044, & T \leq 66 \end{cases}$$

where T denotes environmental color temperature/100.

Further, the module for acquiring a to-be-processed image includes a pixel level adjustment unit configured to adjust a pixel level of the adjusted image to a preset pixel level, and specifically configured to:

perform inverse tone mapping on a preset key frame of the adjusted image, and perform motion estimation on frames other than the preset key frame so as to adjust the pixel level of the adjusted image to the preset pixel level, where one frame is processed for every preset number of frames of the adjusted image, and the processed frame is the key frame.

Further, the pixel level adjustment unit is further configured to use a first neural network to perform inverse tone mapping on the preset key frame of the adjusted image, and use an optical flow method to perform motion estimation on frames other than the preset key frame, where the first neural network is a neural network with an encoder-decoder architecture.

Further, the color vision deficiency correction device further includes an RGB target value setting module configured to set the RGB target value according to a type of color vision deficiency and a degree of color vision deficiency.

Further, the target image generation module includes:

a unit for acquiring a to-be-mapped image, configured to restore the pixel level of the to-be-processed image to an original pixel level to obtain a to-be-mapped image;

a unit for acquiring a to-be-displayed image, configured to map the to-be-mapped image according to the adjustment mapping table and the adjustment matrix to obtain a to-be-displayed image; and a target image generation unit, configured to, if AR display is performed, mix the to-be-displayed image with an illumination information image passing through a lens and then display the image; and if VR display is performed, display the to-be-displayed image.

Further, the unit for acquiring a to-be-mapped image includes:

a first processing subunit, configured to input the to-be-processed image into a second neural network for processing, where the second neural network is an inverted architecture of the first neural network; and a second processing subunit, configured to estimate a motion trajectory of each pixel between the frames other than the preset key frame, and estimate a value displayed by pixels of the frames other than the preset key frame according to a value that needs to be displayed by a current pixel of a current frame and the motion trajectory of each pixel between the frames, so as to obtain the to-be-mapped image.

According to Embodiment 3 of the present invention, a pair of smart glasses is provided, including the color vision deficiency correction device.

Further, the pair of smart glasses includes a first optical element, a color temperature sensor, a camera, a color vision deficiency correction device, a projector, and a second optical element in sequence in a light propagation direction, where the first optical element is configured to reflect an image to the camera;

the color temperature sensor is configured to sense an environmental color temperature and an environmental color;

the camera is configured to collect an image;

the color vision deficiency correction device is configured to perform color vision deficiency correction on the image collected by the camera to generate a target image;

the projector is configured to project the target image onto a glasses lens surface; and the second optical element is configured to transmit the target image on the glasses lens surface to human eyes.

Further, if the pair of smart glasses is a pair of VR glasses, both the first optical element and the second optical element are reflecting mirrors; and if the pair of smart glasses is a pair of AR glasses, the first optical element is a beam splitter, and the second optical element is a beam combiner.

According to Embodiment 4 of the present invention, a controller is provided, including a memory and a processor, where the memory stores a computer program that, when executed by the processor, is capable of implementing the steps of the method.

According to Embodiment 5 of the present invention, a computer-readable storage medium for storing a computer program is provided, where the program, when executed by a computer or a processor, implements the steps of the method.

The present invention has obvious advantages and beneficial effects as compared with the prior art. By means of the foregoing technical solutions, the color vision deficiency correction device and method, the pair of smart glasses, the controller, and the medium according to the present invention can achieve considerable technical progress and practicability, have wide industrial utilization value, and have at least the following advantages:

By dynamically adjusting colors, the present invention can increase the degree of color recognition by people with color vision deficiency and improve imaging effects, can implement good color vision deficiency correction, and facilitate wearing when applied to smart glasses, thereby improving user experience.

The above description is only summary of the technical solutions of the present invention. To help understand the technical means of the present invention more clearly for implementation according to the content of the specification, and to make the above and other objects, features and advantages of the present invention more apparent and easier to understand, preferred embodiments are especially taken as examples in conjunction with the accompanying drawings, and the detailed description is as follows.

REFERENCE NUMERALS

1: Module for acquiring a to-be-processed image
2: Module for determining an adjustment matrix
3: Module for determining an adjustment mapping table
4: Target image generation module

DESCRIPTION OF EMBODIMENTS

In order to further illustrate the technical means and effects adopted by the present invention to achieve the intended objects of the present invention, specific implementations and effects of a color vision deficiency correction device and method, and smart glasses according to the present invention are described in detail as follows with reference to the accompanying drawings and preferred embodiments.

Figure 1:
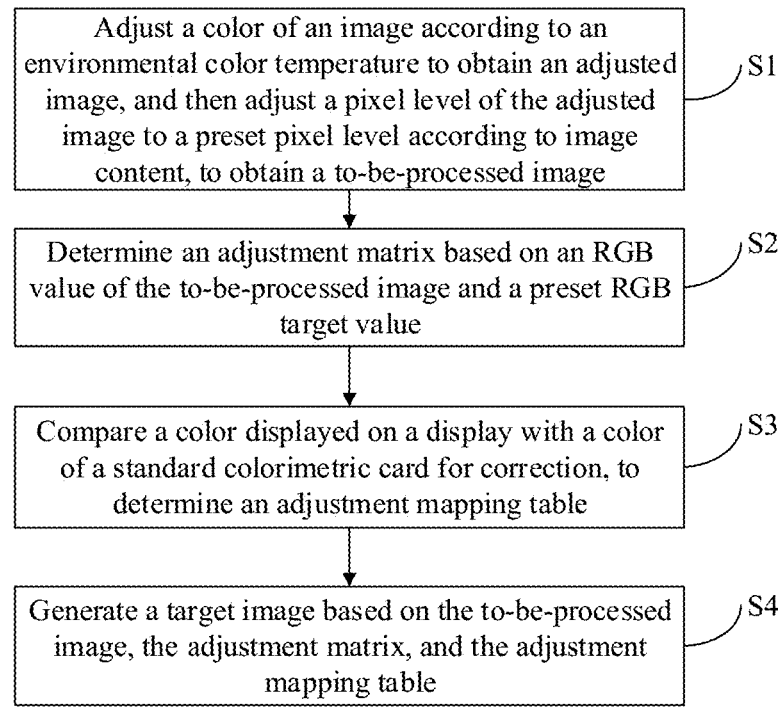
FIG. 1 is a flowchart of a color vision deficiency correction method according to an embodiment of the present invention.

An embodiment of the present invention provides a color vision deficiency correction method, as shown in FIG. 1, including the following steps.

Step S1: Adjust a color of an image according to an environmental color temperature to obtain an adjusted image, and then adjust a pixel level of the adjusted image to a preset pixel level according to image content, to obtain a to-be-processed image.

Step S2: Determine an adjustment matrix based on an RGB value of the to-be-processed image and a preset RGB target value.

The adjustment matrix is specifically obtained by using the following formula:

$$\begin{bmatrix} R_{cvd} \\ G_{cvd} \\ B_{cvd} \end{bmatrix} = M \begin{bmatrix} R \\ G \\ B \end{bmatrix}$$

The right side of the equation denotes values of three RGB channels of normal display, the left side denotes values of the three RGB channels after color vision deficiency correction, and M denotes the adjustment matrix.

As an example, the RGB target value can be set according to a type of color vision deficiency and a degree of color vision deficiency.

Step S3: Compare a color displayed on a display with a color of a standard colorimetric card for correction, to determine an adjustment mapping table.

Step S4: Generate a target image based on the to-be-processed image, the adjustment matrix, and the adjustment mapping table.

As an example, in step S1, an image may be specifically collected by a camera, and a color temperature sensor may be used to compensate for ambient light sensed by the camera, where a color of the image captured by the camera is adjusted according to an environmental color temperature, and an RGB value of the image captured by the camera is adjusted by using the following formula:

$$R = \begin{cases} 255, & T \leq 66 \\ 329.6987 * (T-60)^{-0.133}, & T > 66 \end{cases}$$

$$G = \begin{cases} 99.47 * \ln T - 161.1195, & T \leq 66 \\ 288.12 * (T-60)^{-0.0755}, & T > 66 \end{cases}$$

$$B = \begin{cases} 255, & T \geq 66 \\ 0, & T < 19 \\ 138.51 * \ln(T-10) - 305.044, & T \leq 66 \end{cases}$$

where T denotes environmental color temperature/100, i.e., e.g., for the environmental color temperature of 6000K, T=60.

After the color is adjusted according to the temperature, the environmental color needs to be further estimated according to the image content. As an example, in step S1, the adjusting a pixel level of the adjusted image to a preset pixel level includes step S11: Perform reverse tone mapping on a preset key frame of the adjusted image, and perform motion estimation on frames other than the preset key frame so as to adjust the pixel level of the adjusted image to the preset pixel level, where one frame is processed for every preset number of frames of the adjusted image, and the processed frame is the key frame. The pixel level in a camera system is generally 8 bits. In order to estimate the image more accurately, the preset pixel level can be set to 32 bits.

Figure 2:
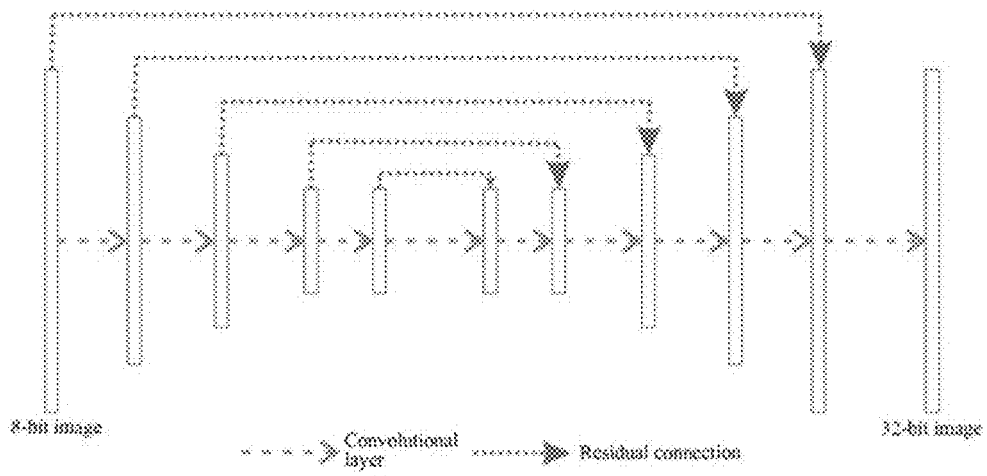
FIG. 2 is a schematic diagram of a neural network of an encoder-decoder architecture according to an embodiment of the present invention.

In step S11, a first neural network may be used to perform inverse tone mapping on the preset key frame of the adjusted image, an optical flow method is used to perform motion estimation on frames other than the preset key frame, and the optical flow method may be used for motion estimation between the frames. The first neural network is a neural network with an encoder-decoder architecture, as shown in FIG. 2.

As an example, step S4 includes the following steps.

Step S41: Restore the pixel level of the to-be-processed image to an original pixel level to obtain a to-be-mapped image.

Step S42: Map the to-be-mapped image according to the adjustment mapping table and the adjustment matrix to obtain a to-be-displayed image.

Step S43: If AR display is performed, mix the to-be-displayed image with an illumination information image passing through a lens and then display the image; and if VR display is performed, display the to-be-displayed image.

With regard to AR glasses, the image that enters the human eye is mainly a mixture of two parts of image information:

$$BlendedColor = f_{FG} + f_{BG}$$

where BlendedColor is the color finally seen by human eyes, $f_{FG}$ denotes the image displayed on the display, and $f_{BG}$ is the illumination information image passing through the lens.

With regard to VR glasses, because the outside world cannot be seen, BlendedColor=$f_{FG}$, the human eye sees only the image displayed on the display.

As an example, step S41 includes:

Step S411: Input the to-be-processed image into a second neural network for processing, where the second neural network is an inverted architecture of the first neural network.

Step S412: Estimate a motion trajectory of each pixel between the frames other than the preset key frame, and estimate a value displayed by pixels of the frames other than the preset key frame according to a value that needs to be displayed by a current pixel of a current frame and the motion trajectory of each pixel between the frames, so as to obtain the to-be-mapped image.

In step S412, optical flow information and the segmented information are used to retain semantic information when a color of an object is converted.

Figures 3A, 3B:
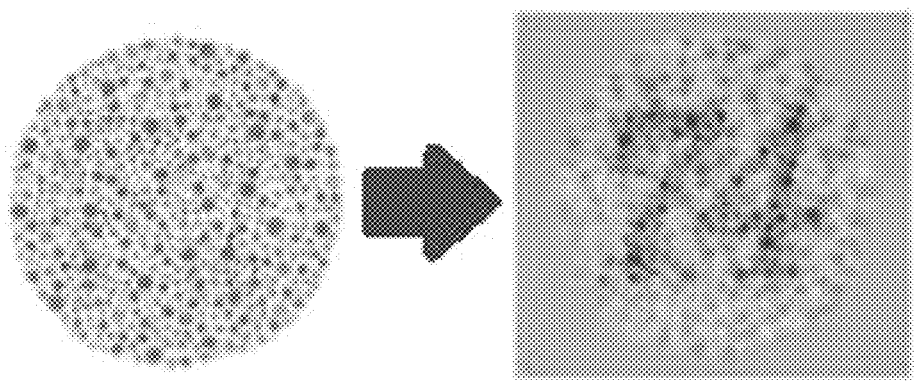
FIG. 3(a) is a schematic diagram of a real image according to an embodiment of the present invention.
FIG. 3(b) is a schematic diagram of an image obtained after color vision deficiency correction is performed on the real image according to an embodiment of the present invention.

Through the method according to the present invention, the degree of color recognition is increased for persons with color vision deficiency. As shown in the example shown in FIG. 3, FIG. 3(a) shows a real image, and FIG. 3(b) is an image seen by persons with color vision deficiency after the conversion of the real image according to the present invention. This example simulates red-green color vision deficiency. It can be seen that a person with color vision deficiency sees gray, and after the treatment using the method according to the present invention, the person with color vision deficiency can distinguish numbers therein, and their recognition ability is enhanced. In addition, the color vision deficiency correction using the method of the present invention can help persons with color vision deficiency to shop, navigate, and identify road signs and traffic lights.

Figure 4:
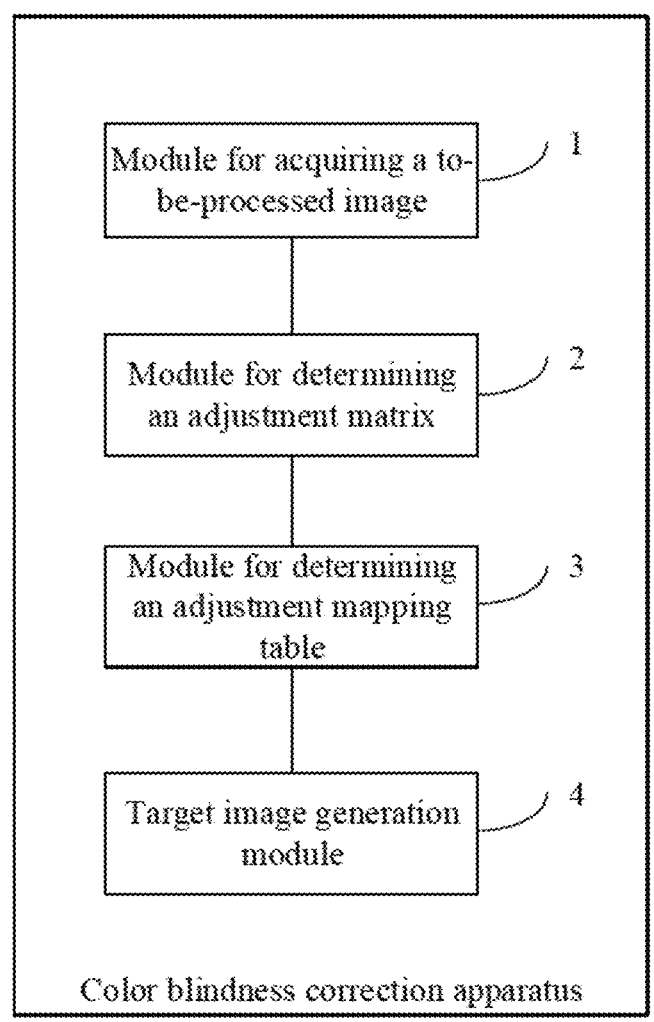
FIG. 4 is a schematic diagram of a color vision deficiency correction device according to an embodiment of the present invention.

The present invention further provides a color vision deficiency correction device, as shown in FIG. 4, including a module 1 for acquiring a to-be-processed image, a module 2 for determining an adjustment matrix, a module 3 for determining an adjustment mapping table, and a target image generation module 4. The module 1 for acquiring a to-be-processed image is configured to adjust a color of an image according to an environmental color temperature to obtain an adjusted image, and then adjust a pixel level of the adjusted image to a preset pixel level according to image content, to obtain a to-be-processed image. The module 2 for determining an adjustment matrix is configured to determine an adjustment matrix based on an RGB value of the to-be-processed image and a preset RGB target value. The module 3 for determining an adjustment mapping table is configured to compare a color displayed on a display with a color of a standard colorimetric card for correction, to determine an adjustment mapping table. The target image generation module 4 is configured to generate a target image based on the to-be-processed image, the adjustment matrix, and the adjustment mapping table.

As an example, the module for acquiring a to-be-processed image 1 includes an image color adjustment unit configured to adjust the color of the image captured by a camera according to the environmental color temperature, and specifically adjust the RGB value of the image captured by the camera by using the following formula:

$$R = \begin{cases} 255, & T \leq 66 \\ 329.6987 * (T-60)^{-0.133}, & T > 66 \end{cases}$$

$$G = \begin{cases} 99.47 * \ln T - 161.1195, & T \leq 66 \\ 288.12 * (T-60)^{-0.0755}, & T > 66 \end{cases}$$

$$B = \begin{cases} 255, & T \geq 66 \\ 0, & T < 19 \\ 138.51 * \ln(T-10) - 305.044, & T \leq 66 \end{cases}$$

where T denotes environmental color temperature/100, i.e., e.g., for the environmental color temperature of 6000K, T=60.

As an example, the module 1 for acquiring a to-be-processed image includes a pixel level adjustment unit configured to adjust a pixel level of the adjusted image to a preset pixel level, and specifically configured to perform inverse tone mapping on a preset key frame of the adjusted image, and perform motion estimation on frames other than the preset key frame so as to adjust the pixel level of the adjusted image to the preset pixel level, where one frame is processed for every preset number of frames of the adjusted image, and the processed frame is the key frame. The pixel level in a camera system is generally 8 bits. In order to estimate the image more accurately, the preset pixel level can be set to 32 bits.

The pixel level adjustment unit is further configured to use a first neural network to perform inverse tone mapping on the preset key frame of the adjusted image, and use an optical flow method to perform motion estimation on frames other than the preset key frame, where the optical flow method may be used for motion estimation between the frames. The first neural network is a neural network with an encoder-decoder architecture.

As an example, the device further includes an RGB target value setting module configured to set the RGB target value according to a type of color vision deficiency and a degree of color vision deficiency.

As an example, the target image generation module 4 includes a unit for acquiring a to-be-mapped image, a unit for acquiring a to-be-displayed image, and a target image generation unit. The unit for acquiring a to-be-mapped image is configured to restore the pixel level of the to-be-processed image to an original pixel level to obtain a to-be-mapped image. The unit for acquiring a to-be-displayed image is configured to map the to-be-mapped image according to the adjustment mapping table and the adjustment matrix to obtain a to-be-displayed image. The target image generation unit is configured to, if AR display is performed, mix the to-be-displayed image with an illumination information image passing through a lens and then display the image; and if VR display is performed, display the to-be-displayed image. With regard to AR glasses, the image that enters the human eye is mainly a mixture of two parts of image information:

$$BlendedColor = f_{FG} + f_{BG}$$

where BlendedColor is the color finally seen by human eyes, $f_{FG}$ denotes the image displayed on the display, and $f_{BG}$ is the illumination information image passing through the lens.

With regard to VR glasses, because the outside world cannot be seen, BlendedColor=$f_{FG}$, the human eye sees only the image displayed on the display.

As an example, the unit for acquiring a to-be-mapped image includes a first processing subunit and a second processing subunit. The first processing subunit is configured to input the to-be-processed image into a second neural network for processing, where the second neural network is an inverted architecture of the first neural network; and the second processing subunit is configured to estimate a motion trajectory of each pixel between the frames other than the preset key frame, and estimate a value displayed by pixels of the frames other than the preset key frame according to a value that needs to be displayed by a current pixel of a current frame and the motion trajectory of each pixel between the frames, so as to obtain the to-be-mapped image. Optical flow information and the segmented information are used to retain semantic information when a color of an object is converted.

Through the method according to the present invention, the degree of color recognition is increased for persons with color vision deficiency. As shown in the example shown in FIG. 3, FIG. 3(a) shows a real image, and FIG. 3(b) is an image seen by persons with color vision deficiency after the conversion of the real image by the device according to the present invention. This example simulates red-green color vision deficiency. It can be seen that a person with color vision deficiency sees gray, and after the treatment using the device according to the present invention, the person with color vision deficiency can distinguish numbers therein, and their recognition ability is enhanced. In addition, the color vision deficiency correction using the device of the present invention can help persons with color vision deficiency to shop, navigate, and identify road signs and traffic lights.

An embodiment of the present invention further provides a pair of smart glasses, including the color vision deficiency correction device according to the embodiment of the present invention.

As an example, the pair of smart glasses includes a first optical element, a color temperature sensor, a camera, a color vision deficiency correction device, a projector, and a second optical element in sequence in a light propagation direction. The first optical element is configured to reflect an image to the camera; the color temperature sensor is configured to sense an environmental color temperature and an environmental color; the camera is configured to collect an image; the color vision deficiency correction device is configured to perform color vision deficiency correction on the image collected by the camera to generate a target image; the projector is configured to project the target image onto a glasses lens surface; and the second optical element is configured to transmit the target image on the glasses lens surface to human eyes.

Figure 5:
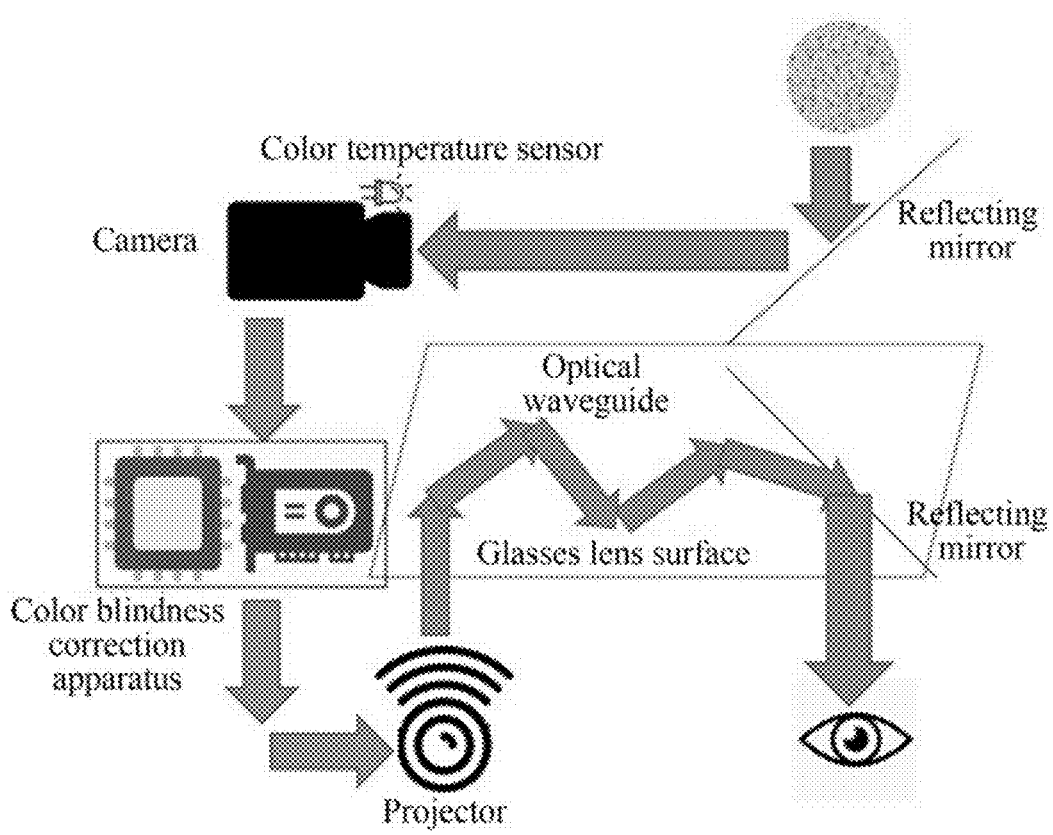
FIG. 5 is a schematic diagram of a pair of smart VR glasses according to an embodiment of the present invention.
Figure 6:
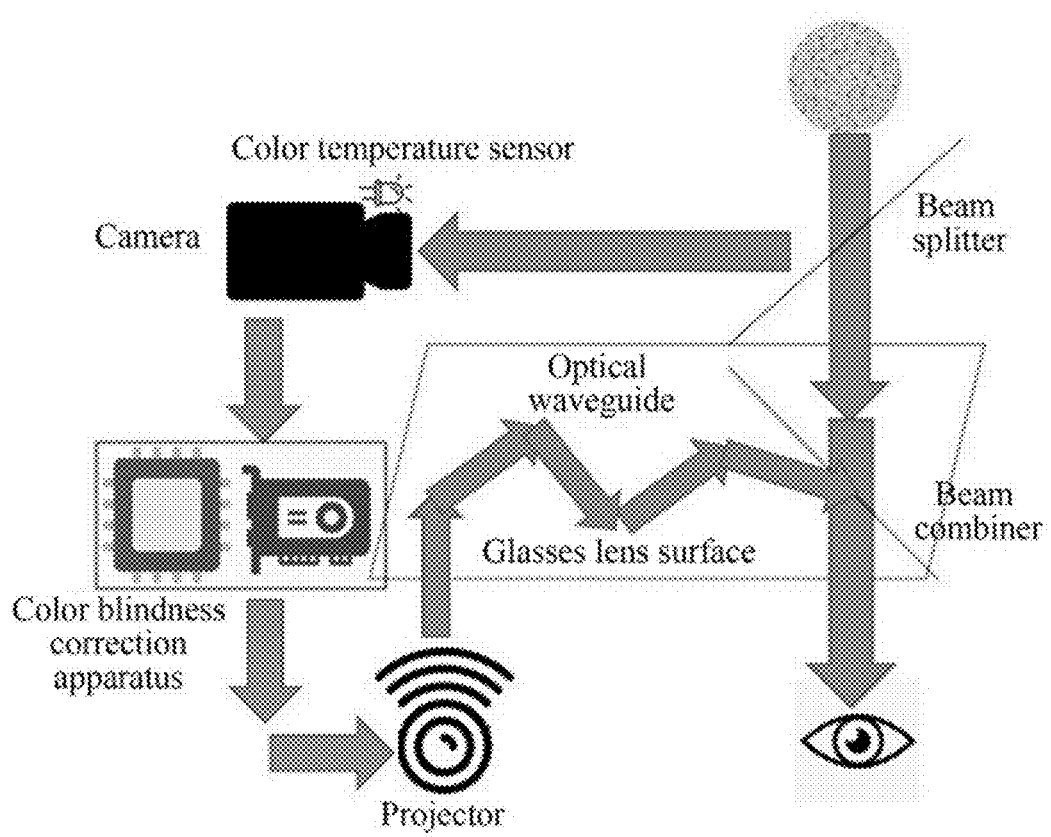
FIG. 6 is a schematic diagram of a pair of smart AR glasses according to an embodiment of the present invention.

As an example, if the pair of smart glasses is a pair of VR glasses, as shown in FIG. 5, both the first optical element and the second optical element are reflecting mirrors; and if the pair of smart glasses is a pair of AR glasses, as shown in FIG. 6, the first optical element is a beam splitter, and the second optical element is a beam combiner.

An embodiment of the present invention further provides a controller, including a memory and a processor, where the memory stores a computer program which, when executed by the processor, is capable of implementing the steps of the color vision deficiency correction method.

An embodiment of the present invention further provides a computer-readable storage medium for storing a computer program, where the program, when executed by a computer or a processor, implements the steps of the color vision deficiency correction method.

By dynamically adjusting colors, the embodiments of the present invention can increase the degree of color recognition by people with color vision deficiency and improve imaging effects, can implement good color vision deficiency correction, and facilitate wearing when applied to smart glasses, thereby improving user experience.

The above is only preferred embodiments of the present invention and is not intended to limit the present invention in any form. Although the present invention has been disclosed by the preferred embodiments above, the embodiments are not intended to limit the present invention. Any person skilled in the art may make some changes or modifications to implement equivalent embodiments with equivalent changes by using the technical contents disclosed above without departing from the scope of the technical solution of the present invention. Any simple modification, equivalent change and modification made to the foregoing embodiments according to the technical essence of the present invention without departing from the content of the technical solution of the present invention shall fall within the scope of the technical solution of the present invention.

What is claimed is:

1. A color vision deficiency correction method, comprising:
    adjusting a color of an image according to an environmental color temperature to obtain an adjusted image, and then adjusting a pixel level of the adjusted image to a preset pixel level according to image content, to obtain a to-be-processed image;
    determining an adjustment matrix based on an RGB value of the to-be-processed image and a preset RGB target value;
    comparing a color displayed on a display with a color of a standard colorimetric card for correction, to determine an adjustment mapping table; and
    generating a target image based on the to-be-processed image, the adjustment matrix, and the adjustment mapping table,
    wherein the adjusting a pixel level of the adjusted image to a preset pixel level comprises: performing inverse tone mapping on a preset key frame of the adjusted image, and performing motion estimation on frames other than the preset key frame so as to adjust the pixel level of the adjusted image to the preset pixel level, wherein one frame is processed for every preset number of frames of the adjusted image, and the processed frame is the key frame; and using a first neural network to perform inverse tone mapping on the preset key frame of the adjusted image, and using an optical flow method to perform motion estimation on the frames other than the preset key frame, wherein the first neural network is a neural network with an encoder-decoder architecture.

2. The color vision deficiency correction method according to claim 1, wherein
the color of the image captured by a camera is adjusted according to the environmental color temperature, and the RGB value of the image captured by the camera is adjusted by using the following formula:

$$R = \begin{cases} 255, & T \le 66 \\ 329.6987 * (T-60)^{-0.133}, & T > 66 \end{cases}$$

$$G = \begin{cases} 99.47 * \ln T - 161.1195, & T \le 66 \\ 288.12 * (T-60)^{-0.0755}, & T > 66 \end{cases}$$

$$B = \begin{cases} 255, & T \ge 66 \\ 0, & T < 19 \\ 138.51 * \ln(T-10) - 305.044, & T \le 66 \end{cases}$$

wherein T denotes environmental color temperature/100.

3. The color vision deficiency correction method according to claim 1,
further comprising: setting the RGB target value according to a type of color vision deficiency and a degree of color vision deficiency.

4. The color vision deficiency correction method according to claim 1, wherein
the generating a target image based on the to-be-processed image, the adjustment matrix, and the adjustment mapping table comprises:
restoring the pixel level of the to-be-processed image to an original pixel level to obtain a to-be-mapped image;
mapping the to-be-mapped image according to the adjustment mapping table and the adjustment matrix to obtain a to-be-displayed image; and
if AR display is performed, mixing the to-be-displayed image with an illumination information image passing through a lens and then displaying the image; and if VR display is performed, displaying the to-be-displayed image.

5. The color vision deficiency correction method according to claim 4, wherein
the restoring the pixel level of the to-be-processed image to an original pixel level to obtain a to-be-mapped image comprises:
inputting the to-be-processed image into a second neural network for processing, wherein the second neural network is an inverted architecture of a first neural network; and
estimating a motion trajectory of each pixel between the frames other than the preset key frame, and estimating a value displayed by pixels of the frames other than the preset key frame according to a value that needs to be displayed by a current pixel of a current frame and the motion trajectory of each pixel between the frames, so as to obtain the to-be-mapped image.

6. A color vision deficiency correction device, comprising:
an image acquisition circuit for acquiring a to-be-processed image, configured to adjust a color of an image according to an environmental color temperature to obtain an adjusted image, and then adjust a pixel level of the adjusted image to a preset pixel level according to image content, to obtain a to-be-processed image;
a matrix adjustment circuit for determining an adjustment matrix, configured to determine an adjustment matrix based on an RGB value of the to-be-processed image and a preset RGB target value;
a table generator circuit for determining an adjustment mapping table, configured to compare a color displayed on a display with a color of a standard colorimetric card for correction, to determine an adjustment mapping table; and
a target image generation circuit, configured to generate a target image based on the to-be-processed image, the adjustment matrix, and the adjustment mapping table,
wherein the image acquisition circuit comprises a pixel level adjustment circuit configured to adjust a pixel level of the adjusted image to a preset pixel level, and configured to:
perform inverse tone mapping on a preset key frame of the adjusted image, and perform motion estimation on frames other than the preset key frame so as to adjust the pixel level of the adjusted image to the preset pixel level, wherein one frame is processed for every preset number of frames of the adjusted image, and the processed frame is the key frame, and
wherein the pixel level adjustment circuit is further configured to use a first neural network to perform inverse tone mapping on the preset key frame of the adjusted image, and use an optical flow method to perform motion estimation on frames other than the preset key frame, wherein the first neural network is a neural network with an encoder-decoder architecture.

7. The color vision deficiency correction device according to claim 6, wherein
the image acquisition circuit comprises an image color adjustment circuit configured to adjust the color of the image captured by a camera according to the environmental color temperature, and specifically adjust the RGB value of the image captured by the camera by using the following formula:

$$R = \begin{cases} 255, & T \le 66 \\ 329.6987 * (T-60)^{-0.133}, & T > 66 \end{cases}$$

$$G = \begin{cases} 99.47 * \ln T - 161.1195, & T \le 66 \\ 288.12 * (T-60)^{-0.0755}, & T > 66 \end{cases}$$

$$B = \begin{cases} 255, & T \ge 66 \\ 0, & T < 19 \\ 138.51 * \ln(T-10) - 305.044, & T \le 66 \end{cases}$$

wherein T denotes environmental color temperature/100.

8. The color vision deficiency correction device according to claim 6,
further comprising an RGB target value setting circuit configured to set the RGB target value according to a type of color vision deficiency and a degree of color vision deficiency.

9. The color vision deficiency correction device according to claim 6, wherein
the target image generation circuit comprises:
a pixel restoration circuit, configured to restore the pixel level of the to-be-processed image to an original pixel level to obtain a to-be-mapped image;
a mapping circuit, configured to map the to-be-mapped image according to the adjustment mapping table and the adjustment matrix to obtain a to-be-displayed image; and
a target image mix circuit, configured to, if AR display is performed, mix the to-be-displayed image with an illumination information image passing through a lens and then display the image; and if VR display is performed, display the to-be-displayed image.

10. The color vision deficiency correction device according to claim 9, wherein
the pixel restoration circuit comprises:
a first processing sub-circuit, configured to input the to-be-processed image into a second neural network for processing, wherein the second neural network is an inverted architecture of a first neural network; and
a second processing sub-circuit, configured to estimate a motion trajectory of each pixel between the frames other than the preset key frame, and estimate a value displayed by pixels of the frames other than the preset key frame according to a value that needs to be displayed by a current pixel of a current frame and the motion trajectory of each pixel between the frames, so as to obtain the to-be-mapped image.

11. A pair of smart glasses, comprising:
a color vision deficiency correction device that includes:
an image acquisition circuit, configured to adjust a color of an image according to an environmental color temperature to obtain an adjusted image, and then adjust a pixel level of the adjusted image to a preset pixel level according to image content, to obtain a to-be-processed image;
a matrix adjustment circuit, configured to determine an adjustment matrix based on an RGB value of the to-be-processed image and a preset RGB target value;
a table generator circuit, configured to compare a color displayed on a display with a color of a standard colorimetric card for correction, to determine an adjustment mapping table; and
a target image generation circuit, configured to generate a target image based on the to-be-processed image, the adjustment matrix, and the adjustment mapping table,
wherein the image acquisition circuit comprises a pixel level adjustment circuit configured to adjust a pixel level of the adjusted image to a preset pixel level, and configured to:
perform inverse tone mapping on a preset key frame of the adjusted image, and perform motion estimation on frames other than the preset key frame so as to adjust the pixel level of the adjusted image to the preset pixel level, wherein one frame is processed for every preset number of frames of the adjusted image, and the processed frame is the key frame, and
wherein the pixel level adjustment circuit is further configured to use a first neural network to perform inverse tone mapping on the preset key frame of the adjusted image, and use an optical flow method to perform motion estimation on frames other than the preset key frame, wherein the first neural network is a neural network with an encoder-decoder architecture.

12. The pair of smart glasses according to claim 11, further comprising a first optical element, a color temperature sensor, a camera, a projector, and a second optical element in sequence in a light propagation direction, wherein
the first optical element is configured to reflect an image to the camera;
the color temperature sensor is configured to sense an environmental color temperature and an environmental color;
the camera is configured to collect an image;
the color vision deficiency correction device is configured to perform color vision deficiency correction on the image collected by the camera to generate a target image;
the projector is configured to project the target image onto a glasses lens surface; and
the second optical element is configured to transmit the target image on the glasses lens surface to human eyes.

13. The pair of smart glasses according to claim 12, wherein
if the pair of smart glasses is a pair of VR glasses, both the first optical element and the second optical element are reflecting mirrors; and
if the pair of smart glasses is a pair of AR glasses, the first optical element is a beam splitter, and the second optical element is a beam combiner.

* * * * *